(12) United States Patent
Beale

(10) Patent No.: US 11,326,634 B2
(45) Date of Patent: May 10, 2022

(54) COMPOSITE STRUCTURE HAVING A TAPERED JOINT AND A METHOD FOR MAKING THE SAME

(71) Applicant: Crompton Technology Group Limited, Solihull (GB)

(72) Inventor: Thomas Beale, Faringdon (GB)

(73) Assignee: CROMPTON TECHNOLOGY GROUP LIMITED, Banbury (GB)

( * ) Notice: Subject to any disclaimer, the term of this patent is extended or adjusted under 35 U.S.C. 154(b) by 540 days.

(21) Appl. No.: 16/411,760

(22) Filed: May 14, 2019

(65) Prior Publication Data

US 2020/0056644 A1 Feb. 20, 2020

(30) Foreign Application Priority Data

Aug. 16, 2018 (EP) ..................................... 18275125

(51) Int. Cl.
*F16B 7/02* (2006.01)
(52) U.S. Cl.
CPC ..................................... *F16B 7/02* (2013.01)
(58) Field of Classification Search
CPC .... F16B 7/02; F16B 7/18; F16B 7/182; F16B 9/054; F16C 7/026
See application file for complete search history.

(56) References Cited

U.S. PATENT DOCUMENTS

| | | | | |
|---|---|---|---|---|
| 3,721,134 A | * | 3/1973 | Lamke | H01H 31/00 74/586 |
| 4,411,114 A | * | 10/1983 | Wurtinger | F16C 7/026 403/267 |
| 5,318,374 A | * | 6/1994 | Rumberger | F16B 4/006 403/277 |
| 9,441,374 B2 | * | 9/2016 | Ganis | F16L 41/086 |
| 10,626,917 B1 | * | 4/2020 | Baird | B64C 25/10 |

(Continued)

FOREIGN PATENT DOCUMENTS

| | | |
|---|---|---|
| EP | 3133298 A1 | 2/2017 |
| GB | 2054083 A | 2/1981 |

(Continued)

OTHER PUBLICATIONS

Extended European Search Report for International Application No. 18275125.5 dated Feb. 22, 2019, 5 pages.

*Primary Examiner* — Daniel J Wiley
(74) *Attorney, Agent, or Firm* — Cantor Colburn LLP

(57) ABSTRACT

A tubular structure is described herein comprising an elongate tubular member extending between a first end and a second end, wherein the tubular member comprises an inwardly tapered portion adjacent said first end, the inwardly tapered portion narrowing the tubular member in a longitudinal direction towards said first end. A nut is also provided internally of said tubular member at said inwardly tapered portion, said nut having an outer surface that is in contact an inner surface of said tubular member. An annular member is also provided externally of said tubular member at said inwardly tapered portion, said annular member having an inner surface that is in contact with said outer surface of said tapered portion. The inner surface of said tubular member at said inwardly tapered portion is tapered so as to extend at an angle that compliments an angle of the outer surface of said nut.

19 Claims, 1 Drawing Sheet

(56) References Cited

U.S. PATENT DOCUMENTS

| | | | |
|---|---|---|---|
| 2012/0060636 A1* | 3/2012 | Dewhirst | F16C 7/026 |
| | | | 74/473.36 |
| 2013/0118301 A1 | 5/2013 | Gallant et al. | |
| 2017/0051767 A1* | 2/2017 | Giannakopoulos | F16C 7/026 |
| 2017/0102012 A1* | 4/2017 | Ganis | F16C 7/026 |
| 2017/0198734 A1* | 7/2017 | Bernard | F16B 7/02 |
| 2018/0283424 A1* | 10/2018 | Beale | B29C 70/86 |
| 2019/0017538 A1* | 1/2019 | Gurvich | B29C 66/126 |

FOREIGN PATENT DOCUMENTS

| | | |
|---|---|---|
| WO | 2008057405 A1 | 5/2008 |
| WO | 2008118229 A2 | 10/2008 |
| WO | 2008118229 A3 | 10/2008 |

* cited by examiner

COMPOSITE STRUCTURE HAVING A TAPERED JOINT AND A METHOD FOR MAKING THE SAME

FOREIGN PRIORITY

This application claims priority to European Patent Application No. 18275125.5 filed Aug. 16, 2018, the entire contents of which is incorporated herein by reference.

TECHNICAL FIELD

The disclosure relates to composite structures having a tapered joint. In particular, the disclosure relates to composite structures having a tapered joint that may be used for forming a connection with another component.

BACKGROUND OF THE INVENTION

Composites are often used for a range of various connecting or joining applications due to their inherent strength to weight ratio. For example, composite tubular structures are currently employed to connect components together, and used in many fields including the motor sports, marine, aerospace and medical fields. In use, these structures may be subjected to axial tensile and compressive loads as well as bending and torque loadings, for example, when used to provide rods or struts. With increasing demand to transmit working loads directly through to the composite tubular structure comes a requirement also to provide a suitable end fitting or connector arrangement.

US 2017/0198734 A1 describes a composite tubular structure comprising an elongate composite member having inwardly tapered ends. Internally embedded nuts with internal threads therein are retained in each end and have outer surfaces complementary to the inner surfaces of the tapered ends. After a rod or end fitting is threaded into the internal nut, an annular member with an inner surface matching the outer surface of the tapered end can then be threaded onto the rod, into mating contact with the tapered end. An additional, external, nut can then also be threaded onto the rod and tightened against the annular member. By tightening the nut, the annular member is clamped tightly against the tapered end, thereby creating a tight connection and bond for transmitting axial loads.

SUMMARY OF THE INVENTION

A tubular structure is described herein comprising: an elongate tubular member extending between a first end and a second end and having an inner surface and an outer surface, wherein the tubular member comprises an inwardly tapered portion adjacent the first end, the inwardly tapered portion narrowing the tubular member in a longitudinal direction towards the first end; and a nut provided internally of the tubular member at the inwardly tapered portion, the nut having an outer surface that is in contact with the inner surface of the tubular member; and an annular member provided externally of the tubular member at the inwardly tapered portion, the annular member having an inner surface and an outer surface; and wherein the inner surface of the annular member is in contact with the outer surface of the tapered portion; and wherein: the inner surface of the tubular member at the inwardly tapered portion is tapered so as to extend at an angle that matches or compliments an angle of the outer surface of the nut, and wherein the outer surface of the tubular member is tapered so as to extend at an angle that matches or compliments an angle of the inner surface of the annular member; and wherein: at least one channel is provided that extends from the outer surface of the annular member, through both of the annular member and the tubular member and at least partially into the nut, and the structure further comprising: a securing member provided within the channel so as to extend from the external surface of the annular member, through the tubular member and at least partially into the nut.

In some examples, this structure is repeated at the opposite end of the tubular structure and so the tubular structure may further comprise a second inwardly tapered portion adjacent the second end, the inwardly tapered portion narrowing the tubular member in a longitudinal direction towards the second end; and a second nut provided internally of the tubular member at the second inwardly tapered portion, the nut having an outer surface that is in contact with the inner surface of the tubular member; and a second annular member provided externally of the tubular member at the second inwardly tapered portion, the second annular member having an inner surface and an outer surface; and wherein the inner surface of the second annular member is in contact with the outer surface of the second tapered portion and wherein: the inner surface of the tubular member at the second inwardly tapered portion is tapered so as to extend at an angle that matches or compliments an angle of the outer surface of the second nut, and wherein the outer surface of the tubular member is tapered at the second end so as to extend at an angle that matches or compliments an angle of the inner surface of the second annular member; and wherein: at least one channel is also provided that extends from the outer surface of the second annular member through both of the second annular member and the tubular member and at least partially into the second nut, and the structure further comprising: a securing member provided within the channel so as to extend from the external surface of the second annular member, through the tubular member and at least partially into the second nut.

In some examples, the diameter of the portion of the channel that extends through the tubular member may be greater than the diameter of the securing member.

The channel may be described as having a first portion that extends through the annular member, a second portion that extends through the tubular member and a third portion that extends into the nut. In some examples, the portion that extends through the tubular member has a greater diameter than the portion that extends through the annular member and also a greater diameter than the portion that extends into the nut.

In some examples, the diameter of the portion of the channel that extends through the wall of the tubular member may be wider than the portions of the channel that extend into the nut and through the annular wedge.

The examples described may be used as a means of transferring forces between two components. This may be achieved by the nut or nuts being configured o receive an end-fitting of such components.

In some examples, the tubular structure may therefore further comprise an end fitting extending from within the nut. In some examples, both of the nuts provided at either end of the tubular member may be configured to receive, and may receive an end-fitting of a component to which the structure may be attached.

In some examples, the tubular member may have a uniform diameter between the first and second tapered portions.

In some examples, the at least one securing member may be a pin, screw, dowel or rivet.

In some examples, the channels may be provided with bushes.

In some examples, the channels may comprise a countersink feature or a counterbore feature.

In some examples, the channels may comprise an internal thread.

In some examples, the taper angle of the inwardly tapered portion may be less than 10 degrees.

In some examples, the tubular member may be a composite tubular member.

A method of forming a tubular structure is also described herein, comprising: providing an elongated tubular member extending between a first end and a second end and having an inner surface and an outer surface, wherein the tubular member comprises an inwardly tapered portion adjacent the first end, the inwardly tapered portion narrowing the tubular member in a longitudinal direction towards the first end; providing a nut internally of the tubular member at the inwardly tapered portion, the nut having an outer surface that is in contact with the inner surface of the tubular member, the inner surface of the tubular member at the inwardly tapered portion is tapered so as to extend at an angle that matches or compliments an angle of the outer surface of the nut; providing an annular member externally of the tubular member at the inwardly tapered portion, the annular member having an inner surface and an outer surface; and wherein the inner surface of the annular member is in contact with the outer surface of the tapered portion, wherein the inner surface of the annular member is shaped to match or compliment the outer surface of the tubular member; providing at least one channel that extends from the outer surface of the annular member, through both of the annular member and the tubular member and at least partially into the nut; inserting a securing member within the channel so as to extend from the external surface of the annular member, through the tubular member and at least partially into the nut.

In some examples, the method may further comprise providing an inwardly tapered portion adjacent the second end, the inwardly tapered portion narrowing the tubular member in a longitudinal direction towards the second end; providing a second nut internally of the tubular member at the second inwardly tapered portion, the nut having an outer surface that is in contact with the inner surface of the tubular member, wherein the inner surface of the tubular member at the second inwardly tapered portion is tapered so as to extend at an angle that matches or compliments an angle of the outer surface of the second nut; providing a second annular member externally of the tubular member at the second inwardly tapered portion, the second annular member having an inner surface that is in contact with the outer surface of the tapered portion, wherein the inner surface of the second annular member is shaped to match or compliment the outer surface of the tubular member; and providing at least one channel that extends from the outer surface of the second annular member, through both of the second annular member and the tubular member and at least partially into the second nut; inserting a securing member within the channel so as to extend from the external surface of the second annular member, through the tubular member and at least partially into the second nut.

In some examples, the step of providing a securing member within the channel may comprise providing a pin, screw, dowel or rivet within the channel.

In some examples, the method may further comprise providing a bush into the at least one channel.

In some examples, the method may further comprise providing the at least one channel with a countersink feature or counterbore feature.

In some examples, the method may further comprise providing the at least one channel with an internal thread.

In some examples, the method may further comprise providing an end fitting extending from the nut.

BRIEF DESCRIPTION OF THE DRAWINGS

Certain examples of a new type of composite tubular structure will now be described in greater detail by way of example only and with reference to the accompanying drawings in which.

DETAILED DESCRIPTION OF THE INVENTION

The examples described herein provide an improved mechanical, non-bonded method of joining a composite tubular structure to an end fitting such that the tubular structure may be assembled to another component. The examples described herein also provide a composite tubular structure that may be connected to another component via an end fitting. These examples aim to, where possible, reduce the mass and complexity of the connector and composite tubular structure without compromising on strength.

In some examples, the other component to which the composite structure is connected may be a space frame assembly (or other mechanism) to transfer significant tensile and compressive loads.

In some examples, the composite tubular structure may be manufactured so as to have relatively short conical ends such that they reduce the overall diameter of the composite tube. The tube may also encapsulate conical metal fittings ("internal nuts"), typically with an internal thread. In some examples, the conical fittings may match or compliment the conical internal surface of the composite tube.

Figure 1:
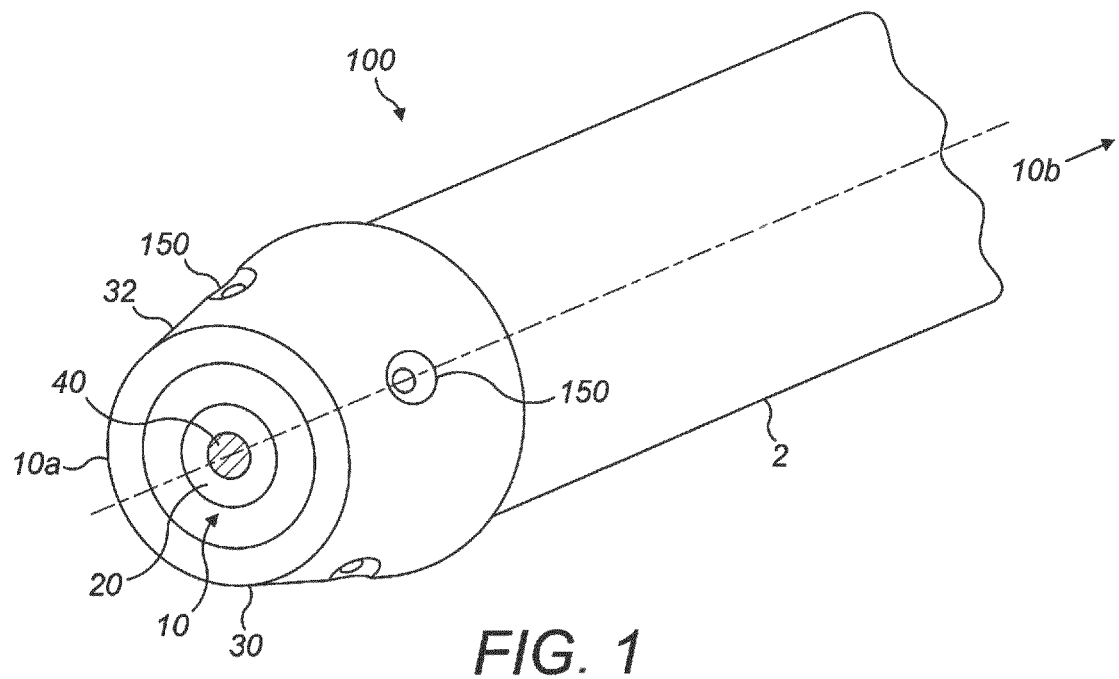
FIG. 1 shows an example of a first end of a new type of composite tubular structure as described herein.
Figure 2:
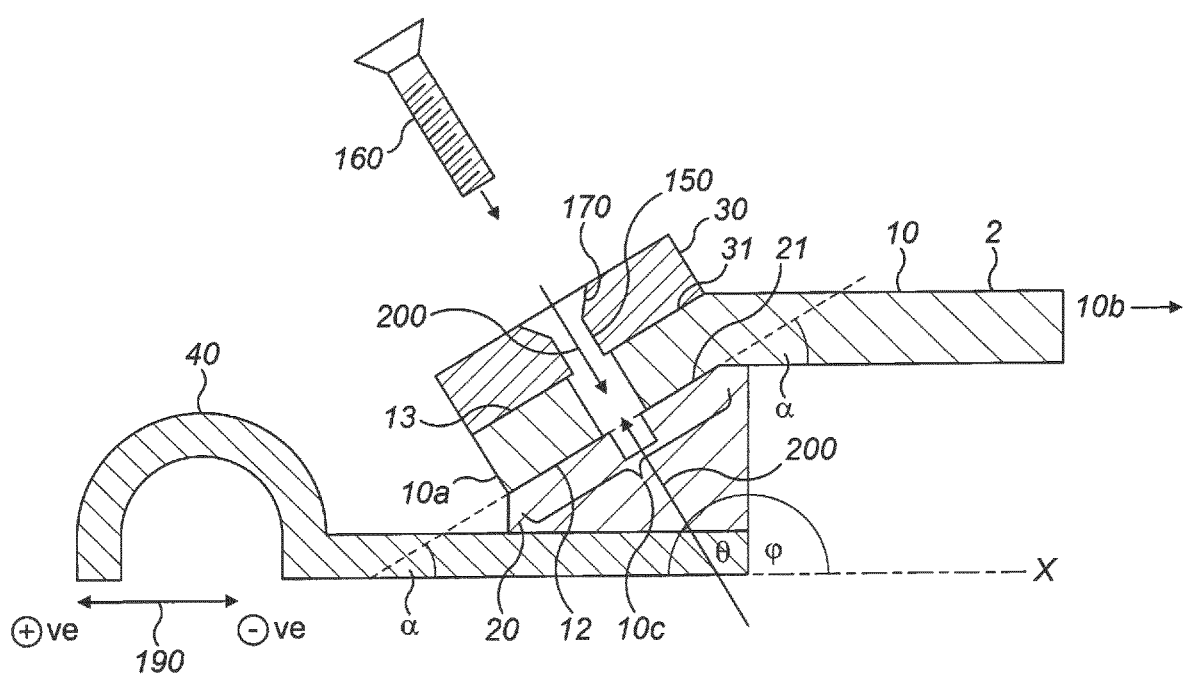
FIG. 2 depicts a cross-sectional view of the structure of FIG. 1, wherein an end fitting is also inserted into the composite tubular structure.

FIGS. 1 and 2 depict a composite tubular structure 100 comprising an elongated tubular member 10 (in some examples, this may be a tube or a composite tube) extending longitudinally between a first end 10a and a second end 10b. As can be seen in FIGS. 1 and 2, the tubular member 10 may be formed of a central cylindrical portion 2 of generally uniform radius. In some examples, the first end 10a and the second end 10b are formed as mirror images of each other so that the same structure as shown in the figures is provided at both ends. At the first end 10a, an end portion 10c tapers so as to reduce in radius as it extends away from the uniform section 2 and towards the end 10a. That is, in this tapered portion 10c, the radius of the tubular member 10 decreases in the direction of the first end 10a.

In some examples, only one end 10a may be tapered. In other examples, both ends 10a, 10b of the tubular member 10 are identical and may both be tapered, each having a tapered portion 10c, 10d (not shown). This reduction in radius at the tapered portions 10c, 10d may be linear (forming substantially conical end portions) or non-linear (such that the reduction in radius may vary with axial distance, forming dome-shaped end portions).

Any other possible shapes of tubular member 10 with different radial profiles are also contemplated and included in this disclosure. These could include non-symmetrical structures, structures with a curved central axis, corrugated tubes, and tubes with opposed conical portions. Different designs of tubular structures are engineered depending on their particular intended use. Some tubular structures may be designed in order to accommodate high tensile loads, high compressive loads, or high torque loads or a combination of these.

The composite tubular structure 100 further comprises a nut 20 retained internally to the composite tubular member 10 in the at least one end (in FIG. 1, this is at the first end 10a which is tapered). As explained below, this nut 20 may be used for forming a connection with another component 40. In some examples, this connection may be made via the use of an end fitting 40 provided internally to the nut 20. In some examples, the end fitting 40 may be sectioned.

The tubular member 10 has an internal surface 12 and an external surface 13. As can be seen from the cross-section view of FIG. 2, the inner surface 12 of the at least one inwardly tapered section 10c is angled so as to have a shape which follows the shape of a tapered outer surface 21 of the nut 20. This provides a constriction which retains the nut 20 within the tubular member 10.

An annular member (which may in some examples be referred to as a "wedge" since it has a tapered cross-section) 30 may also be provided on the external conical surface 13 of the tubular member 10. In other words, the annular member 30 is provided so as to be disposed externally to the tubular member 10 and in contact with the outer surface 13 of the at least one tapered portion 10c of the tubular member 10. The annular member 30 also has a matching tapered, or conical, internal surface 31, (or at least a surface that compliments its shape) such that the contact between the two surfaces 13, 31 is complete. As can be seen in the figures, the angle of the taper of the inner surface 31 of the annular member 30 matches or at least compliments the angle of the taper of the outer surface 13 of the tapered portion 10c of the tubular member 10.

The annular member 30 also has a circumferentially extending outer surface 32 and comprises at least one channel 150 extending therethrough. In some examples, the annular member 30 comprises a plurality of these channels 150 extending therethrough. As described below, these channels 150 may be configured to receive a securing member 160. These channels 150 extend from the outer surface 32 of the annular member 30, entirely through the annular member 30 and past the inner surface 31 of the annular member 30. The channel or channels 150 also further extend entirely through the tubular member 10 between its outer surface 13 and its inner surface 12. In some examples, such as that shown in FIG. 2, the channel or channels 150 only extend partially into the nut 20. In this way, the various components of the composite tubular member 100 (including the annular member 30, the tubular structure 10 and the nut 20) may be clamped together with a securing member 160.

As shown in FIG. 1, the channel or channels 150 may be formed so as to be circumferentially offset from each other around the circumferential outer surface 32 of the annular member 30.

As mentioned above, these channels 150 extend right through the wall of the annular member, from its outer surface to its inner surface. The channels 150 are further formed by being in line with the corresponding channels formed through the wall of the tubular member 10 and are further aligned with holes in the nut 20.

In some examples, the securing member 160 may comprise a pin or screw. In some examples, the channels 150 extending through the annular member 30 may also have a countersink 170 or counter bore (not shown) feature to accommodate the head of the pin or screw 160. As can be seen in FIG. 2, this means that the entrance to the channel 150 at the outer surface 32 of the annular member 30 is bevelled so that the radius at the entrance to the channel 150 is larger than the radius of the channel as it extends away from the entrance and into/through the annular member 30. In some examples, the radius of the channel at the countersink or outer surface of the annular member 30 may therefore also be greater than the radius of the channel as it exits through the inner surface 31 of the annular member 30. In some examples, such as that shown in the figures herein, the channel 150 may have the same radius as it extends from the annular member 30 and through the tubular member 10 and the nut 20. In other examples, as can be seen in FIG. 2, the diameter of the portion of the channel 150 that extends through the tubular member 10 may be greater than the diameter of the securing member 160. This means that the securing member 160 is not in bearing contact with the tubular member 10 under normal service loads.

The channel may be described as having a first portion that extends through the annular member, a second portion that extends through the tubular member and a third portion that extends into the nut. In some examples, the portion that extends through the tubular member has a greater diameter than the portion that extends through the annular member and also a greater diameter than the portion that extends into the nut.

This is shown in FIG. 2, wherein the diameters of the portions of the channel 150 that extend through the annular member and into the nut are smaller than the portion of the channel that extends through the tubular member 10. This means that, at this portion of the channel that is extending through the tubular member, the securing member 160 may not make bearing contact with the tubular member 10. The examples described herein generally rely on the high frictional forces produced as a result of the clamping of the tubular member 10 by the securing members 160. However, should these frictional forces be overcome, the tubular member 10 will move relative to the nut 20 and annular member 30 and cause the securing member 160 to make bearing contact with the tubular member 10. This can be seen as a safety feature, as it acts to retain the tubular member 10 in case of slipping.

In some examples wherein a plurality of channels 150 are provided, a number of securing means 160 such as pins, dowels, screws or rivets etc. (or any other suitable elongated securing means) are fitted so as to extend into these channels 150 and therefore extend through both the annular member 30 and the tubular member 10 and at least partially into the internal nut 20. The securing means 160 are then secured into and engaged with the internal nut 20.

The securing members 160 may be pins, screws, dowels, rivets or other suitable fastening means. They are inserted through each of the channels 150. The diameter of the cross section of the securing members is substantially equal to the diameter of the channels 150 in the annular member 30 and the nut 20. In the case that the securing member 160 is a screw, the channels in the annular member 30 and nut 20 may be internally threaded.

As mentioned above, in some examples wherein both ends of the tubular member 10 are tapered, this structure as shown in FIGS. 1 and 2 may also be repeated at the opposite end 10b of the tubular member 10. For example, a second inwardly tapered portion may be provided adjacent the second end 10b, the inwardly tapered portion 10d (not shown) narrowing the tubular member 10 in a longitudinal direction towards the second end 10b. A second nut 20 may also be provided internally of the tubular member 10 at this second inwardly tapered portion 10d. In the same way as at the first end 10a, the nut 20 may have an outer surface 21 that is in contact with the inner surface 12 of the tubular member 10. A second annular member 30 may also be provided externally of the tubular member 10 at the second inwardly tapered portion 10d, the second annular member having an inner surface 31 and an outer surface 32. The inner surface 31 of the second annular member 30 may be in contact with the outer surface 13 of the second tapered portion 10d. The inner surface 12 of the tubular member 10 at the second inwardly tapered portion 10d is tapered so as to extend at an angle that matches or compliments an angle of the outer surface of the second nut 20. The outer surface 13 of the tubular member 10 is tapered at the second end 10b so as to extend at an angle that matches or compliments an angle of the inner surface 31 of the second annular member 30. As at the first end 10a, at least one channel 150 may be provided that extends from the outer surface 32 of the second annular member 30, through both of the second annular member 30 and the tubular member 10 and extends at least partially into the second nut 20. These channels 150 may also be configured to receive a securing member 160. In some examples, a securing member 160 is provided within each channel 150 so as to extend from the external surface 32 of the second annular member 30, through the tubular member 10 and at least partially into the second nut 20. This second end 10b of the structure may therefore be described as being a mirror image of the first end 10a.

The fitment of the securing means 160 squeezes the annular member 30 towards the nut 20, to thereby clamp the various components of the conical composite section 10d together. In some examples, bushes (not shown) may also be installed into the channels 150. These may act to reduce the bearing stress in this region when the joint is loaded during operation.

A suitable end fitting 40 (such as a rod end or other threaded component) may then be screwed into the nut 20 as shown in FIG. 2. In some examples, an end fitting 40 may be secured into the embedded nut 20 by engagement with an internal thread of the nut 20. In some examples, the nuts 20 provided at both ends 10a, 10b of the tubular structure may be configured to receive an end-fitting 40.

In an example wherein the securing members are pre-loaded pins 160, when in tension, the internal nut 20 is pulled against the internal conical surface 12 of the tubular member 10. In compression, however, the internal nut 20 is pulled away from the tubular member 10, thereby unloading the preloaded pins 160. On unloading, the pins 160 pull the annular wedge 30 towards the conical section 10c, to thereby deliver the force into the tubular member 10.

As mentioned above, in examples wherein a portion of the channel 150 has a larger diameter through the tubular member, the pin or pins 160 are not normally in bearing contact with the tubular member 10 on assembly or during normal service loads. The pins 160 may be shaped in such a manner as to evenly distribute the contact pressure around the circumference of the annular-member-to-tubular-member interface (e.g. the countersink feature 170 discussed above). The pins 160 also act to lock the joint and provide resistance to loosening by vibration.

As mentioned above, the examples described herein generally rely on the high frictional forces produced as a result of the clamping of the tubular member 10 by the securing members 160. If these frictional forces are overcome, the tubular member 10 will then move relative to the nut 20 and annular member 30 and cause the securing member 160 to make bearing contact with the tubular member 10. This can be seen as a safety feature, as it acts to retain the tubular member 10 in case of slipping.

FIG. 2 shows the assembled composite structure 100 with the annular member 30 and nut 20 clamping the tubular member 10 by means of applied preload 200 to the securing member 160. The nut 20 is secured by the high frictional forces between the nut 20, annular member 30 and tubular member 10 produced by the clamping preload force 200. As no external nut is required, the mass of the joint is reduced in comparison to known composite structure joints.

The examples described herein allow for the composite structure 100 to be fully assembled with all required preload already applied, before the attachment of an end fitting 40. In practical applications, this means that the tubular structure 10 and end fitting 40 can be detached from each other without unloading the preload in the securing members 160. This facilitates easier reconfiguration of the system and allows for changes to the overall length of the tubular structure 10 and end fitting 40 to be more easily made (by use of different lengths of end fitting).

In the examples described herein, the preload forces 200 are applied normally to the external planar surface 32 of the annular member 30 and at an angle ($\theta$, $\varphi$) to the eventual service load 190 of the joint.

This offset between preload 200 and service load 190 means that the preload 200 does not vary greatly with applied service load, resulting in a joint with a predictable linear stiffness response to an applied load 190. It also means that less preload may be applied to the joint relative to the service load requirement, allowing for greater service loads.

As shown in FIG. 2, the offset angle between preload 200 and service load 190 is $\theta$ or $\varphi$ depending on which direction the service load acts (whether it is tensile or compressive). If the taper angle ($\alpha$) is relatively small (e.g. 10 degrees or less with reference to the longitudinal axis X), such that the radius of the tubular structure only slightly tapers at its ends, then the offset angle ($\theta$, $\varphi$) between service load and preload is close to 90 degrees.

As the preload load path 200 can be separated from the service load 190 path by close to 90°, the ratio of the joint preload 200 to service load 190 applied is significantly reduced. The composite structure joint may either require less preload or provide an increase in service loads. Additionally the force required to induce sliding between the conical faces is increased as the pins 160 may hold a larger normal force, providing larger clamping on the composite conical section. Slipping is limited by the friction force generated by the normal contact forces on the conical surfaces of the composite section. In the event that these frictional forces are overcome, the pins may bear onto the channels 150 in the composite.

As mentioned above, bushes may be included to reduce the bearing stress in this region as a fail-safe. The bearing load is reduced by virtue of the expansion (or in compression, contraction) of the conical surfaces circumferentially as the metallic components slide, providing an additional load path. The compression generated on the conical composite section radially by the external annular member 30 and the internal nut 20 may also serve to reduce the bearing stress. A secondary advantage to this joint is full adjustability of strut length via the threaded end fitting 40 without having to unload and preload the joint once more. Consequently, the installation of the strut requires less effort. The absence of adhesive makes qualification of the joint easier to achieve.

In some examples, the composite tubular structure 100 described herein may be assembled by providing the nut 20 internally to the tubular member 10 and providing the annular member 30 externally to the tubular member 10 and then forming, e.g. by drilling, or some other means, the channel or channels 150 so that they extend completely through the annular member 30 and the tubular member 10 and only partway into the internal nut 20. As can be seen in the figures, this is all performed at the tapered portion 10*c*. In other examples, the channels 150 may be formed individually in each of the components 10, 20, 30 and the components later positioned so that the channels provided in each are coaxially aligned with each other. That is, each individual channel 150 may be formed by coaxially aligning individual channels provided in each of the annular member 30, tubular member 10 and embedded nut 20.

The invention claimed is:

1. A tubular structure comprising:
    an elongate tubular member extending between a first end and a second end, wherein the tubular member comprises an inwardly tapered portion adjacent said first end, the inwardly tapered portion narrowing the tubular member in a longitudinal direction towards said first end; and
    a nut provided internally of said tubular member at said inwardly tapered portion, said nut having an outer surface that is in contact with an inner surface of said tubular member; and
    an annular member provided externally of said tubular member at said inwardly tapered portion, said annular member having an inner surface that is in contact with said outer surface of said tapered portion; and wherein:
    the inner surface of said tubular member at said inwardly tapered portion is tapered so as to extend at an angle that compliments an angle of the outer surface of said nut, and wherein
    said outer surface of said tubular member is tapered so as to extend at an angle that compliments an angle of said inner surface of said annular member; and wherein:
    at least one channel is provided that extends from an outer surface of said annular member, through both of said annular member and said tubular member and at least partially into said nut, and further comprising:
    a securing member provided within said channel so as to extend from said outer surface of said annular member, through said tubular member and at least partially into said nut.

2. The tubular structure of claim 1, further comprising:
    a second inwardly tapered portion adjacent said second end, the second inwardly tapered portion narrowing the tubular member in a longitudinal direction towards said second end; and
    a second nut provided internally of said tubular member at said second inwardly tapered portion, said nut having an outer surface that is in contact with said inner surface of said tubular member; and
    a second annular member provided externally of said tubular member at said second inwardly tapered portion, said second annular member having an inner surface that is in contact with said outer surface of said second tapered portion; and wherein:
    the inner surface of said tubular member at said second inwardly tapered portion is tapered so as to extend at an angle that compliments an angle of the outer surface of said second nut, and wherein
    said outer surface of said tubular member is tapered at said second end so as to extend at an angle that compliments an angle of said inner surface of said second annular member; and wherein:
    at least one channel is provided that extends from an outer surface of said second annular member, through both of said second annular member and said tubular member and at least partially into said second nut, and said structure further comprising:
    a securing member provided within said channel so as to extend from said outer surface of said second annular member, through said tubular member and at least partially into said second nut.

3. The assembly of claim 2, wherein said tubular member has a uniform diameter between said first and second inwardly tapered portions.

4. The tubular structure claim 1, wherein a portion of the channel that extends through the tubular member has a greater diameter than a diameter of the securing member.

5. The tubular structure of claim 1, wherein said at least one channel has a first portion that extends through the annular member, a second portion that extends through the tubular member and a third portion that extends into the nut and wherein said second portion has a greater diameter than said first and third portions.

6. The tubular structure of claim 1, wherein said at least one channel comprises countersink feature or a counterbore feature.

7. The tubular structure of claim 1, wherein said at least one channel comprises an internal thread.

8. The tubular structure of claim 1, further comprising an end fitting extending from within said nut.

9. The tubular structure of claim 1, wherein the taper angle of the inwardly tapered portion is less than 10 degrees.

10. The tubular structure of claim 1, wherein the tubular member is a composite tubular member.

11. A method of forming a tubular structure, comprising:
    providing an elongated tubular member extending between a first end and a second end, wherein the tubular member comprises an inwardly tapered portion adjacent said first end, the inwardly tapered portion narrowing the tubular member in a longitudinal direction towards said first end;
    providing a nut internally of said tubular member at said inwardly tapered portion, said nut having an outer surface that is in contact with said inner surface of said tubular member, the inner surface of said tubular member at said inwardly tapered portion is tapered so as to extend at an angle that compliments an angle of the outer surface of said nut;
    providing an annular member externally of said tubular member at said inwardly tapered portion, said annular member having an inner surface that is in contact with said outer surface of said tapered portion, wherein said inner surface of said annular member is shaped to compliment said outer surface of said tubular member;
    providing at least one channel that extends from an outer surface of said annular member, through both of said annular member and said tubular member and extends at least partially into said nut; and
    inserting a securing member within said channel so as to extend from said outer surface of said annular member, through said tubular member and at least partially into said nut.

12. The method of claim 11 further comprising:

providing an inwardly tapered portion adjacent said second end, the inwardly tapered portion narrowing the tubular member in a longitudinal direction towards said second end;

providing a second nut internally of said tubular member at said second inwardly tapered portion, said nut having an outer surface that is in contact with said inner surface of said tubular member, wherein the inner surface of said tubular member at said second inwardly tapered portion is tapered so as to extend at an angle that compliments an angle of the outer surface of said second nut;

providing a second annular member externally of said tubular member at said second inwardly tapered portion, said second annular member having an inner surface that is in contact with said outer surface of said tapered portion, wherein said inner surface of said second annular member is shaped to compliment said outer surface of said tubular member; and providing at least one channel that extends from an outer surface of said second annular member, through both of said second annular member and said tubular member and extends at least partially into said second nut; and inserting a securing member within said channel so as to extend from said outer surface of said second annular member, through said tubular member and at least partially into said second nut.

13. The method of claim 12, further comprising:

providing said at least one channel with a countersink feature or counterbore feature.

14. The method of claim 13, further comprising providing said at least one channel with an internal thread.

15. The method of claim 12, further comprising providing said at least one channel with an internal thread.

16. The method of claim 11, further comprising:

providing said at least one channel with a countersink feature or counterbore feature.

17. The method of claim 16, further comprising providing said at least one channel with an internal thread.

18. The method of claim 11, further comprising providing said at least one channel with an internal thread.

19. The method of claim 11, further comprising inserting an end fitting into said nut.

\* \* \* \* \*